(12) United States Patent
Lundin et al.

(10) Patent No.: US 8,794,809 B2
(45) Date of Patent: Aug. 5, 2014

(54) LIGHT INJECTION COUPLER FOR COUPLING LIGHT GUIDES

(75) Inventors: David J. Lundin, Woodbury, MN (US);
David G. Freier, St. Paul, MN (US);
Kenneth A. Epstein, St. Paul, MN (US);
Scott D. Gullicks, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 415 days.

(21) Appl. No.: 12/934,108

(22) PCT Filed: Apr. 1, 2009

(86) PCT No.: PCT/US2009/039057
§ 371 (c)(1),
(2), (4) Date: Sep. 23, 2010

(87) PCT Pub. No.: WO2009/134572
PCT Pub. Date: Nov. 5, 2009

(65) Prior Publication Data
US 2012/0020107 A1    Jan. 26, 2012

Related U.S. Application Data

(60) Provisional application No. 61/049,083, filed on Apr. 30, 2008.

(51) Int. Cl.
*F21V 7/04* (2006.01)

(52) U.S. Cl.
USPC .............................. 362/551; 362/555; 385/31

(58) Field of Classification Search
USPC .......... 362/551, 555, 581, 26; 385/31, 44, 50, 385/47
See application file for complete search history.

(56) References Cited

U.S. PATENT DOCUMENTS

| | | | |
|---|---|---|---|
| 5,103,337 | A | 4/1992 | Schrenk et al. |
| 5,122,905 | A | 6/1992 | Wheatley et al. |

(Continued)

FOREIGN PATENT DOCUMENTS

| | | |
|---|---|---|
| DE | 198 03 537 A1 | 8/1999 |
| DE | 103 49 788 A1 | 5/2005 |

(Continued)

OTHER PUBLICATIONS

International Search Report, PCT/US2009/039057/, Jun. 24, 2009, 3 pages.

(Continued)

*Primary Examiner* — Robert May
(74) *Attorney, Agent, or Firm* — Bradford B. Wright

(57) ABSTRACT

A lighting system has one or more light guides capable of guiding light, each comprising a core and two optically smooth faces. A cavity adjacent to two of the optically smooth faces has an opening and a reflective-transmissive surface opposite the opening. A cover having a light source is proximate to and occludes the opening. A major portion of any light emitted from the light source is reflected by the reflective-transmissive surface of the cavity and is injected into the light guides, and a minor portion of any light emitted by the light source is transmitted through the reflective-transmissive surfaces of the cavity and emitted from the lighting system. A light injection coupler is also disclosed that has an optically transmissive housing and suitable for use to couple ends of at least one light guide thereby making a lighting system.

2 Claims, 3 Drawing Sheets

(56) References Cited

U.S. PATENT DOCUMENTS

| | | | |
|---|---|---|---|
| 5,225,166 | A | 7/1993 | Zarian et al. |
| 5,360,659 | A | 11/1994 | Arends et al. |
| 5,432,876 | A | 7/1995 | Appeldorn et al. |
| 5,845,038 | A | 12/1998 | Lundin et al. |
| 5,882,774 | A | 3/1999 | Jonza et al. |
| 5,898,810 | A | 4/1999 | Devens et al. |
| 6,033,604 | A | 3/2000 | Lundin et al. |
| 6,039,553 | A | 3/2000 | Lundin et al. |
| 6,077,462 | A | 6/2000 | Lundin et al. |
| 6,107,916 | A | 8/2000 | Beck et al. |
| 6,157,490 | A | 12/2000 | Wheatley et al. |
| 6,259,855 | B1 | 7/2001 | Lundin |
| 6,297,906 | B1 | 10/2001 | Allen et al. |
| 6,367,941 | B2 | 4/2002 | Lea et al. |
| 6,379,592 | B1 | 4/2002 | Lundin et al. |
| 6,473,554 | B1 | 10/2002 | Pelka et al. |
| 6,510,267 | B1 | 1/2003 | Hulse et al. |
| 6,531,230 | B1 | 3/2003 | Weber et al. |
| 6,540,377 | B1 * | 4/2003 | Ota et al. .................... 362/231 |
| 6,582,103 | B1 | 6/2003 | Popovich et al. |
| 6,614,972 | B1 | 9/2003 | Lundin |
| 6,623,667 | B2 | 9/2003 | Lundin |
| 6,647,199 | B1 | 11/2003 | Pelka et al. |
| 6,848,822 | B2 | 2/2005 | Ballen et al. |
| 6,863,428 | B2 | 3/2005 | Lundin |
| 6,888,675 | B2 | 5/2005 | Ouderkirk et al. |
| 6,956,995 | B1 | 10/2005 | Shafaat et al. |
| 6,957,904 | B2 | 10/2005 | Randall |
| 7,052,168 | B2 | 5/2006 | Epstein et al. |
| 7,237,926 | B2 | 7/2007 | Fan |
| RE40,227 | E | 4/2008 | Cobb, Jr. |
| 7,407,311 | B2 * | 8/2008 | Yang .................... 362/555 |
| 7,515,229 | B2 * | 4/2009 | Chang .................... 349/114 |
| 7,611,271 | B2 | 11/2009 | Meis et al. |
| 7,677,780 | B2 | 3/2010 | Lundin et al. |
| 7,703,965 | B2 * | 4/2010 | Montagne .................... 362/558 |
| 2001/0036336 | A1 | 11/2001 | Vrieze |
| 2002/0031676 | A1 | 3/2002 | Jonza et al. |
| 2008/0002403 | A1 | 1/2008 | Kim |
| 2008/0037127 | A1 | 2/2008 | Weber |
| 2008/0037277 | A1 | 2/2008 | Yamaguchi et al. |

FOREIGN PATENT DOCUMENTS

| | | |
|---|---|---|
| EP | 0 933 588 A2 | 8/1999 |
| JP | U05-55567 | 7/1993 |
| JP | 2005-44661 | 2/2002 |
| JP | 2002-324409 | 11/2002 |
| JP | 2003-98359 | 4/2003 |
| JP | 2003-150084 | 5/2003 |
| JP | 2007-224601 | 9/2007 |
| WO | WO 99/36248 A2 | 7/1999 |
| WO | WO 01/57435 A1 | 8/2001 |
| WO | WO 2007/034432 A2 | 3/2007 |
| WO | WO 2009/134573 A1 | 11/2009 |

OTHER PUBLICATIONS

Written Opinion of the International Searching Authority, PCT/US2009/039057, Jun. 24, 2009, 7 pages.

"Optical coating", Wikipedia, retrieved from the Internet: URL:http://en.wikipedia.org/wiki/Optical_coating [retrieved on Aug. 31, 2012].

Hecht E.; Zajac A.: "Optics", 1986, pp. 311-312, Addison-Wesley, Reading, US.

Extended European Search Report, EP12173333, mailed Feb. 7, 2013, 7 pages.

\* cited by examiner

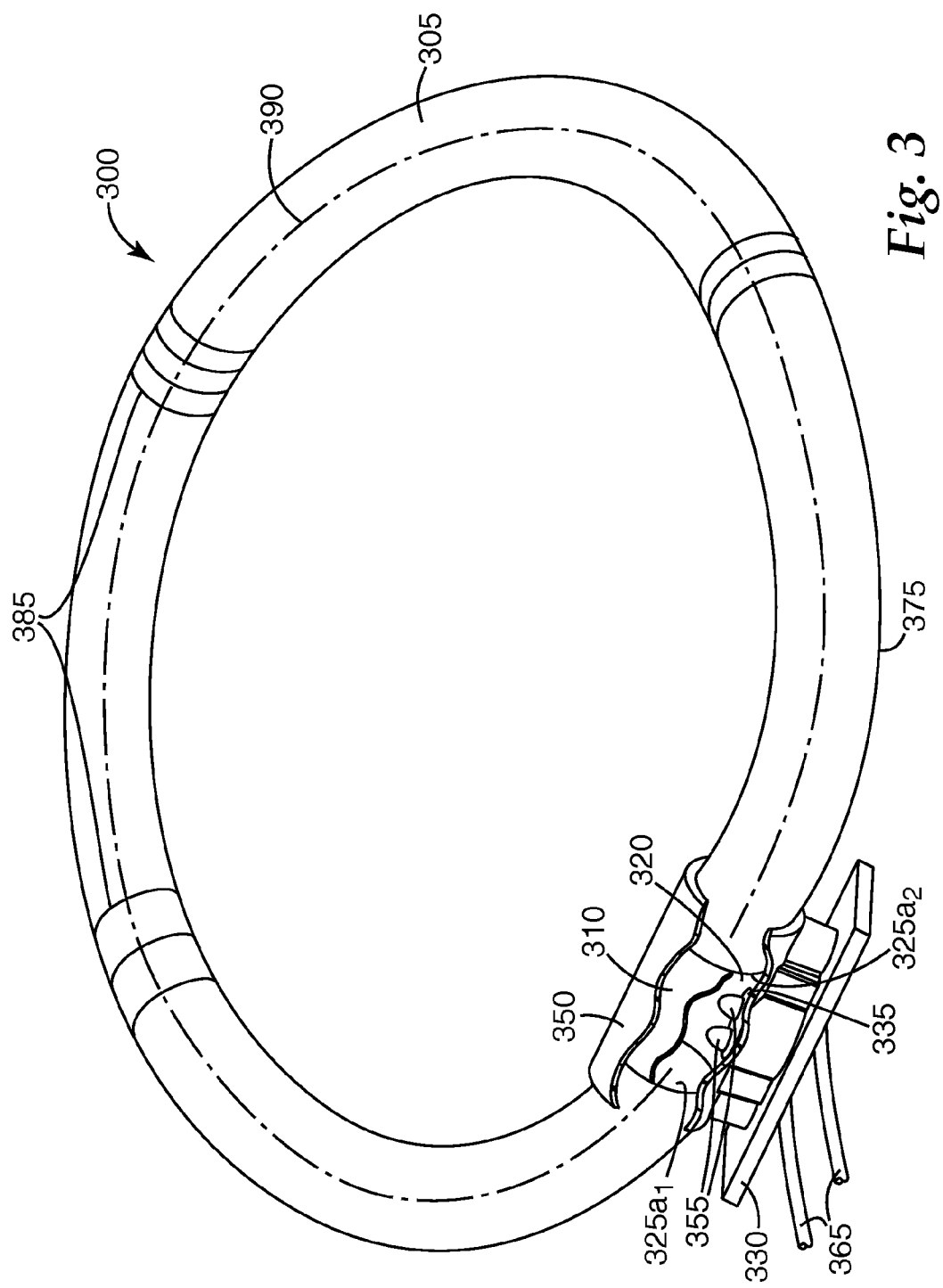

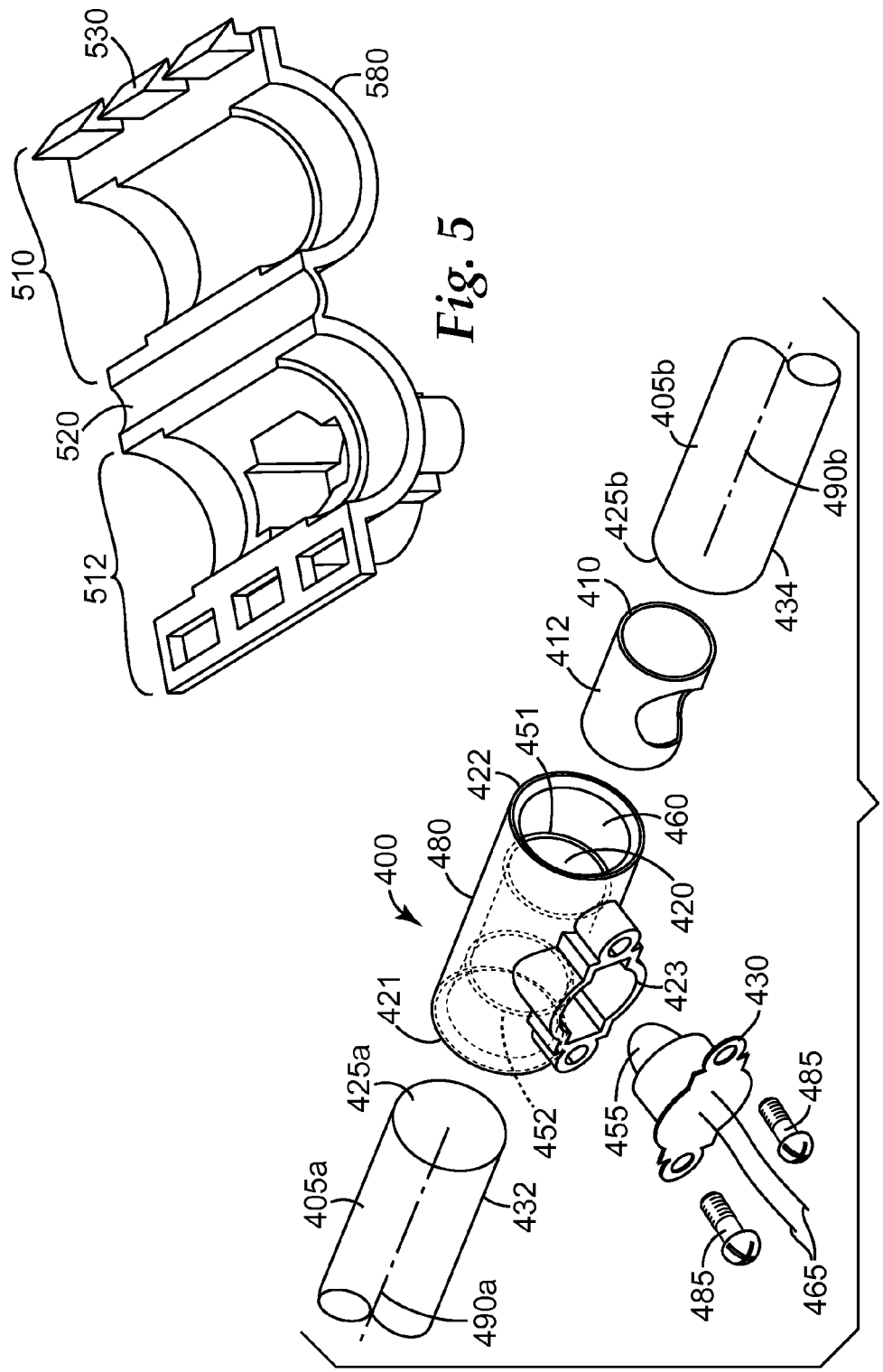

LIGHT INJECTION COUPLER FOR COUPLING LIGHT GUIDES

CROSS-REFERENCE TO RELATED APPLICATIONS

This application is a national stage filing under 35 U.S.C. §371 of PCT/US2009/039057, filed Apr. 1, 2009, which claims priority to U.S. Provisional Application No. 61/049,083, filed Apr. 30, 2008, and the disclosure of which is incorporated by reference in its entirety herein.

FIELD

The present disclosure relates generally to light guide-based lighting systems.

BACKGROUND

Optically transparent materials (for example, glass or transparent polymers) may be used as a light guide to propagate light. A light guide typically includes at least one surface adapted to receive light from a light source and an optically smooth surface for reflecting light propagating through the light guide. Common examples of light guides include optical fibers and/or rods, and planar waveguides.

Light guides are also used as components in lighting (that is, illumination) systems. Typical light guides have an internally reflective relatively high index of refraction core and an optional lower index of refraction cladding disposed on the core. In these systems, light is injected (that is, enters at an angle less than or equal to the critical angle for internal reflection by the light guide) into at least one end of a light guide and allowed to exit the light guide at a predetermined position or positions along the length of the light guide. Methods for encouraging light to exit a light guide at a desired location are known as extraction techniques. Many extraction techniques cause light to leak from a light fiber in an uncontrolled fashion. Such techniques include subjecting the fiber to relatively sharp bends and removing and/or roughening a portion of the light guide core or cladding to provide a diffuse surface which causes light to escape. Extraction techniques using light extraction structures (for example, notches) spaced along the light fiber are also used for extracting light from a light guide in a controlled fashion.

However, the use of light guides in light systems of relatively large size has been limited by the difficulty of maintaining an acceptable, aesthetically pleasing, and reasonably uniform light intensity over relatively long lengths.

SUMMARY

In one aspect, the present disclosure provides a lighting system comprising:

m light guides capable of guiding light in m respective longitudinal directions, each of the m light guides respectively comprising a core and two optically smooth faces, the optically smooth faces being respectively aligned substantially perpendicularly to the m respective longitudinal directions;

n cavities, each of the n cavities respectively comprising an opening and a reflective-transmissive surface opposite the opening, the cavity being adjacent to two of the optically smooth faces; and n covers respectively disposed adjacent to the n cavities and occluding the openings of the n cavities, the n covers respectively comprising n light sources in optical communication with the respective reflective-transmissive surfaces of the n cavities, a major portion of any light emitted from the n light sources being reflected by the respective reflective-transmissive surfaces of the n cavities and injected into the m light guides, and a minor portion of any light emitted by the n light sources being transmitted through the respective reflective-transmissive surfaces of the n cavities and emitted from the lighting system;

wherein m and n are independently integers that are at least one.

In some embodiments, m is not less than n. In some embodiments, m and n are 1. In some embodiments, at least some of the n cavities are integrally formed in at least some of the m light guides.

In some embodiments, p of the n cavities are substantially contained within p respective adjacent optically transmissive housings, and any light transmitted through the respective reflective-transmissive surfaces of the p cavities and emitted from the lighting system passing through a respective adjacent optically transmissive housing, p being a positive integer less than or equal to n.

In some embodiments, at least one of the m light guides comprises a light extraction element. In some embodiments, at least one of the n light sources comprises a light emitting diode. In some embodiments, at least one of the n light sources comprises a plurality of light emitting diodes, each having a different color. In some embodiments, at least one of the n light sources comprises an optical fiber optically coupled to a lamp. In some embodiments, at least one of the n cavities respectively comprises a specularly reflective reflective-transmissive surface. In some embodiments, at least one of the n cavities respectively comprises a diffusely reflective reflective-transmissive surface. In some embodiments, at least one of the m light guides respectively comprises a flexible core. In some embodiments, at least one of the m light guides respectively comprises an organic polymer. In some embodiments, at least one of the m light guides respectively further comprises a cladding on its core, the cladding having a lower index of refraction than the core. In some embodiments, at least one (for example, one, a majority, or all) of the n cavities has a respective reflective-transmissive surface that extends up to its respective cover and optically smooth faces of the respective light guides.

In another aspect, the present disclosure provides a light injection coupler comprising:

an optically transmissive housing having first, second, and third openings;

a conduit extending between the first, second, and third openings, each of the first and second openings being adapted to engage at least two end portions of at least one light guide while maintaining a cavity therebetween, the at least two end portions being capable of guiding light in at least first and second respective longitudinal directions, the conduit having a reflective-transmissive surface adjacent to the cavity and opposite the third opening, and the at least two ends each having an optically smooth face aligned substantially perpendicularly to its respective longitudinal direction;

a cover comprising a light source, the cover being affixed to the housing and disposed proximate to and occluding the third opening of the housing, the light source being in optical communication with the reflective-transmissive surface, wherein a major portion of any light emitted from the light source is reflected by the reflective-transmissive surface and injected into the at least first and second end portions, and wherein a minor portion of any light emitted by the light source being transmitted through the reflective-transmissive surface and through the optically transmissive housing.

In some embodiments, the reflective-transmissive surface is specularly reflective. In some embodiments, the reflective-transmissive surface is diffusively reflective. In some embodiments, the reflective-transmissive surface comprises a multilayer optical film. In some embodiments, the light source comprises at least one light emitting diode. In some embodiments, the light source comprises a plurality of light emitting diodes, each having a different color. In some embodiments, the light source comprises an optical fiber optically coupled to a lamp. In some embodiments, the optically transmissive housing comprises first and second portions flexibly connected by a hinge, and the first and second portions being further fastened one to another by at least one mechanical fastener. In some embodiments, at least one of the first and second openings comprises a respective collar.

Advantageously, lighting systems according to the present disclosure may be fabricated such that they provide a reasonably uniform light intensity over relatively long lengths, especially when viewed from distances typical of their intended application. Accordingly, they are particularly useful for those applications where the aesthetic appeal of the lighting system is important. Examples of such applications include vehicle trim lighting, architectural lighting, and commercial signage.

In some embodiments, aesthetically pleasing lighting systems according to the present disclosure may be conveniently fabricated using light guides in combination with one or more light injection couplers according the present disclosure.

As used herein:

"opposite the opening" in reference to the reflective-transmissive surface means that at least a portion of the reflective-transmissive surface is opposite the opening, although the reflective-transmissive surface may extend beyond that region;

"disposed proximate to and occluding" means covering or disposed within and blocking transmission of light;

"injected into a light guide" means that light enters the light guide at an angle such that it is internally reflected and guided by the light guide;

"light guide" refers to an object that can guide (that is, propagate) light through internal reflection within its body;

"light" means visible light;

"longitudinal direction" as applied to a light guide refers to a direction of propagation, which may or may not be linear or planar (for example, in the case of a curved light guide);

"major portion" means more than half;

"minor portion" means less than half;

"optical communication" as applied to two objects means that light can be transmitted from one to the other either directly or indirectly using optical methods (for example, reflection, diffraction, refraction);

"optically smooth" means essentially free of surface features that contribute to light loss through scattering mechanisms;

"optically transmissive" means transparent or translucent to light, and not opaque;

"reflective-transmissive surface" means a surface that is simultaneously reflective and transmissive to light impinging from one direction; as, for example, in the case of a one-way mirror; and "substantially perpendicularly" means at an angle of from about 80 degrees to 90 degrees.

BRIEF DESCRIPTION OF THE DRAWINGS

FIG. 3 is a perspective cutaway view of an exemplary light system according to the present disclosure;

FIG. 4 is an exploded perspective view of an exemplary light injection coupler according to the present disclosure; and FIG. 5 is a perspective view of an optically transmissive plastic housing suitable for use in the exemplary light injection coupler shown in FIG. 4.

DETAILED DESCRIPTION

Figure 1:
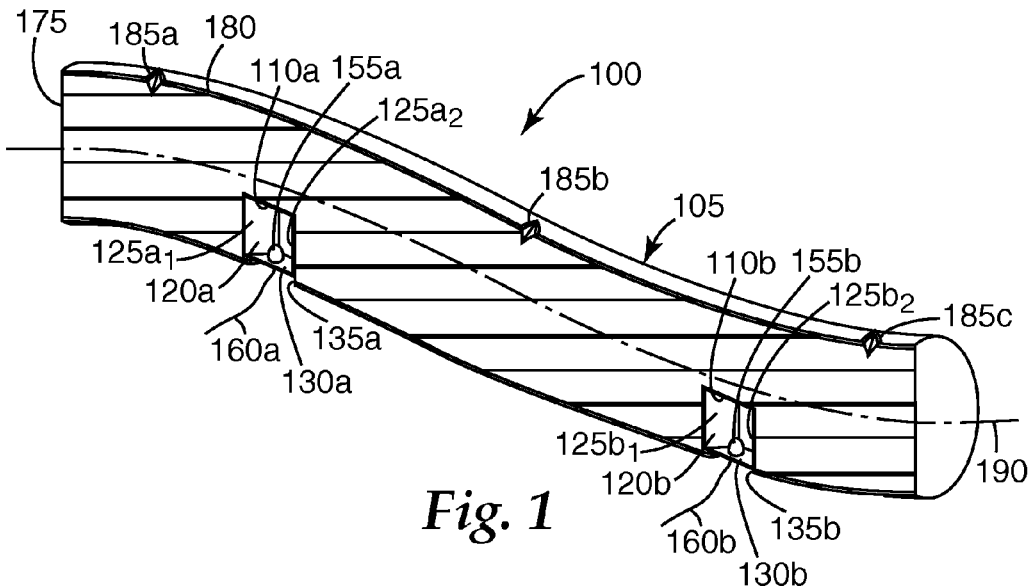
FIG. 1 is a perspective cutaway of an exemplary light system according to the present disclosure.
Figure 2:
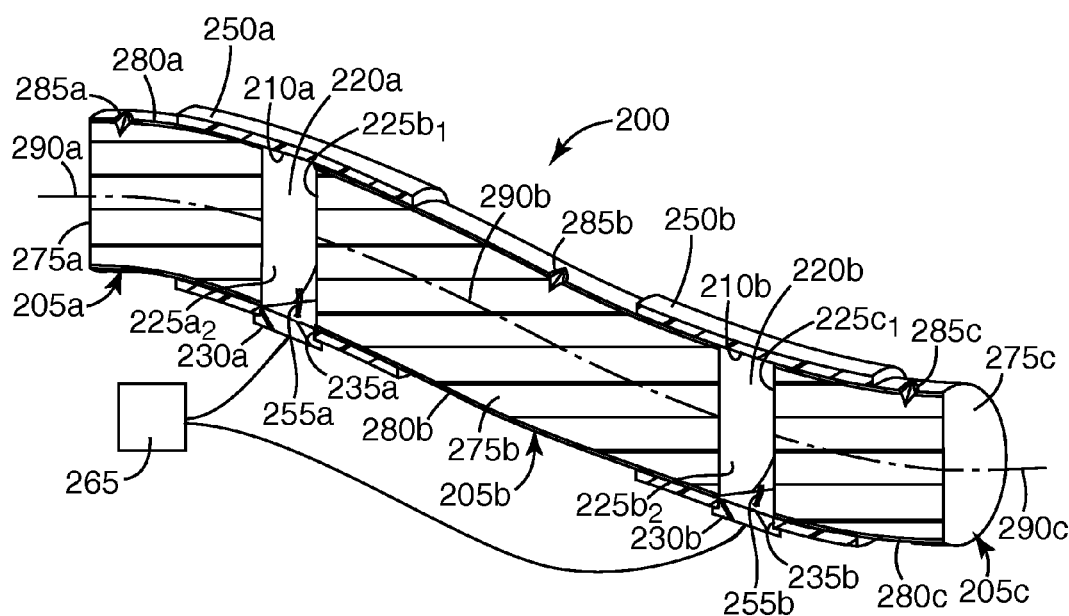
FIG. 2 is a perspective cutaway of an exemplary light system according to the present disclosure.

Lighting systems according to the present disclosure include, for example, those shown in FIGS. 1-3.

Referring now to FIG. 1, exemplary lighting system 100 comprises a light guide 105 that is capable of guiding light in longitudinal direction 190. Light guide 105 comprises flexible core 175 having optional cladding 180 thereon. Light guide 105 comprises two cavities 120a, 120b, each integrally formed in light guide 105. Each of cavities 120a, 120b is, respectively, adjacent two optically smooth faces $125a_1$, $125a_2$ and $125b_1$, $125b_2$, and reflective-transmissive surfaces 110a, 110b opposite openings 135a, 135b. Optically smooth faces $125a_1$, $125a_2$ and $125b_1$, $125b_2$ are aligned substantially perpendicularly to longitudinal direction 190. Light guide 105 has optional light extraction elements (shown as notches) 185a, 185b, 185c distributed along its length. Covers 130a, 130b respectively occlude openings 135a, 135b. Covers 130a, 130b comprise respective light sources 155a, 155b (shown as light emitting diodes "LEDs") electrically supplied through wires 160a, 160b. Light sources 155a, 155b are in optical communication with respective reflective-transmissive surfaces 110a, 110b.

Another exemplary embodiment of a lighting system is shown in FIG. 2. Referring now to FIG. 2, exemplary lighting system 200 comprises light guides 205a, 205b, 205c that are capable of guiding light in respective longitudinal directions 290a, 290b, 290c. Light guides 205a, 205b, 205c respectively comprise flexible cores 275a, 275b, 275c having respective optional claddings 280a, 280b, 280c thereon. Lighting system 200 comprises two cavities 220a, 220b situated adjacent respective optically transmissive housings 250a, 250b. Each of cavities 220a, 220b is, respectively, adjacent two optically smooth faces $225a_2$, $225b_1$ and $225b_2$, $225c_1$, and reflective-transmissive surfaces 210a, 210b opposite openings 235a, 235b. Optically smooth faces $225a_2$, $225b_1$ and $225b_2$, $225c_1$ are aligned substantially perpendicularly to respective longitudinal directions 290a, 290b, 290c. Light guide 205 has optional light extraction elements 285a, 285b, 285c distributed along its length. Covers 230a, 230b, respectively, occlude openings 235a, 235b. Covers 230a, 230b comprise respective light sources 255a, 255b (shown as light fibers) optically connected to lamp 265. Light sources 255a, 255b are in optical communication with respective reflective-transmissive surfaces 210a, 210b.

Yet another embodiment of an exemplary lighting system, wherein m and n are 1, is shown in FIG. 3. Referring now to FIG. 3, exemplary lighting system 300 comprises light guide 305 that is capable of guiding light in longitudinal direction 390. Light guide 305 comprises core 375 having optional cladding 380 (not shown) thereon. Lighting system 300 comprises cavity 320, situated adjacent optically transmissive housing 350. Cavity 320 is adjacent two optically smooth faces $325a_1$, $325a_2$ and reflective-transmissive surface 310 opposite opening 335. Optically smooth faces $325a_1$, $325a_2$ are aligned substantially perpendicularly to longitudinal direction 390. Light guide 305 has optional light extraction elements 385 distributed along its length. Cover 330 is proximate to and occludes opening 335. Cover 330 comprises light source 355 (shown as multiple LEDs of different colors), electrically supplied by wires 365, and in optical communication with reflective-transmissive surface 310.

Light guides generally comprise a core and an optional cladding. Typically, the core is bounded by optically smooth surfaces, optionally interrupted by one of more light extraction structures that direct light out of the light guide. They may have any shape that is effective for internal reflection and propagation of light. Examples of suitable shapes and configurations include, for example, rods having round, square, elliptical, D-shaped, or many-sided profiles, and flat sheets or panels. For example, the light guide may comprise a cylindrical guide (for example, a polymer light guide designed to emit guided light at one or more points along its length), or a planar light guide (for example, a sheet or ribbon). Further details concerning light guides and methods for their manufacture may be found, for example, in U.S. Pat. No. 6,039,553 (Lundin et al.); U.S. Pat. No. 6,367,941 (Lundin et al.); U.S. Pat. No. 6,259,855 (Lundin); U.S. Pat. No. 6,367,941 (Lea et al.); and RE40,227 (Cobb, Jr.). Light guides are also available from commercial sources; for example, as 3M Precision Lighting Elements (PLEs) from 3M Company, St. Paul, Minn.

Many suitable cores are known in the light guide/optical fiber art. The core is typically continuous, and may be made of a material or combination of materials that is sufficiently transparent and internally reflective to effectively propagate light along a longitudinal direction (typically for a distance of at least 10 centimeters, and more typically at least one meter). Examples of suitable materials include glass, quartz, and organic polymers (for example, thermoplastic and/or thermoset polymers). The core may be solid, liquid, or hollow, typically solid. The core may be flexible or rigid, or anything in between, although for many applications flexibility is desirable. Exemplary polymeric cores include: acrylic cores, for example, as described in are described in U.S. Pat. No. 5,898,810 (Devens et al.); and urethane cores, for example, as described in U.S. Pat. No. 6,379,592 (Lundin et al.). The core typically has a refractive index of at least about 1.45, more typically at least about 1.50 or even at least about 1.55. Methods for forming suitable cores are known and include, for example, extrusion, molding, and drawing. Alternatively, the core may be obtained from a commercial source.

Likewise, a wide variety of suitable cores are known in the light guide/optical fiber art. Examples of materials useful for the optional cladding include heat shrinkable materials, elastomers (for example, thermoplastic polyolefins, polyamides, polyurethanes, and combinations thereof), and fluoropolymers (for example, polymerization products of tetrafluoroethylene, chlorotrifluoroethylene, hexafluoropropene, vinylidene fluoride, perfluoroalkylvinyl ethers, trifluoroethylene, and combinations thereof). An exemplary useful fluoropolymer includes the polymerization product of tetrafluoroethylene, hexafluoropropene, and vinylidene fluoride.

The optically smooth faces may be any suitable surface, including, for example, a Fresnel window or a polished surface. The optically smooth faces may optionally have a coating (for example, an antireflective coating) thereon.

The optional cladding may be made of a single polymeric layer, or may include a plurality of concentric layers. One exemplary multi-layer cladding includes (a) a first layer comprising a fluoropolymer (for example, the polymerization product of tetrafluoroethylene, hexafluoropropene, and vinylidene fluoride), (b) a second layer surrounding the first layer comprising a thermoplastic polymer (for example, a polyurethane), and (c) a third layer surrounding the second layer comprising a thermoplastic polymer (for example, a polyolefin). In general, the optional cladding, if present, has a refractive index lower than that of the core on which it is disposed. Typically, the index of refraction of the optional cladding is at least about 0.05 or even at least about 0.10 less than the index of refraction of the core. Both clad and unclad cores are suitable for use in the present disclosure. Further details concerning the optional cladding may be found in U.S. Pat. No. 5,898,810 (Devens et al.).

If integral to a light guide, a cavity may be formed (for example, by molding) at the time of fiber manufacture or fabricated at a later time (for example, by laser or mechanical machining) In those embodiments in which two light guides are used to form a cavity, the cavity is typically easily formed by a coupling device (for example, a light injection coupler according to the present disclosure). The size and shape of the cavity are not critical, although they should generally be selected as to maximize injection of reflected and/or direct light illumination through the optically smooth faces and injected into the light guide(s) at an angle less than the critical angle of the light guide.

The reflective-transmissive surface is generally more reflective than transmissive. Depending on the particular design of the lighting system, the ratio of reflection to transmission may be adjusted as to minimize overall difference in appearance to an observer at an intended viewing distance. Various materials may be used to provide the reflective-transmissive surface including, for example, vapor-coated metal (for example, silver, gold, aluminum), electroplated metal, metal salt (for example, barium sulfate) or metal oxide (for example, aluminum oxide, titanium dioxide) films, multilayer optical films (for example, as available under the trade designations "Vikuiti Enhanced Specular Reflector Film" or "Vikuiti Durable Enhanced Specular Reflector Film—Metal" from 3M Company, St. Paul, Minn.), and combinations thereof.

A multilayer optical film (for example, a polymeric multiplayer optical film) typically includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 micrometer. However, thicker layers can also be included, such as skin layers at the outer surfaces of the multilayer optical film, or protective boundary layers (PBLs) disposed between the multilayer optical films that separate the coherent groupings of microlayers. Such a multilayer optical film body can also include one or more thick adhesive layers to bond two or more sheets of multilayer optical film in a laminate.

In a simple embodiment, the microlayers can have thicknesses and refractive index values corresponding to a ¼-wave stack, that is, arranged in optical repeat units or unit cells each having two adjacent microlayers of equal optical thickness (f-ratio=50%), such optical repeat unit being effective to reflect by constructive interference light whose wavelength $\lambda$ is twice the overall optical thickness of the optical repeat unit. Thickness gradients along a thickness axis of the film (for example, the z-axis) can be used to provide a widened reflection band. Thickness gradients tailored to sharpen such band edges (at the wavelength transition between high reflection and high transmission) can also be used, as discussed in U.S. Pat. No. 6,157,490 (Wheatley et al.). For polymeric multilayer optical films, reflection bands can be designed to have sharpened band edges as well as 'flat top' reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designed can be configured to reduce or to excite certain higher-order reflections; for example, as described in U.S. Pat. No. 5,360,659 (Arends et al.) and U.S. Pat. No. 5,103,337 (Schrenk et al.).

Multilayer optical films can be designed to reflect one or both polarizations of light over at least one bandwidth. Through careful manipulation of these layer thicknesses and indices of refraction along the various film axes, the multilayer optical film can be made to behave as a highly reflective mirror for one axis of polarization, and as a weaker, less reflective mirror (more transmissive) for the orthogonal axis of polarization. Thus, for example, the multilayer optical films may be tuned to reflect strongly one polarization of light in the visible region of the spectrum while being weakly reflecting (substantially transparent) for an orthogonal polarization axis. With the appropriate choice of birefringence for the polymer microlayers, and the appropriate choice of microlayer thicknesses, a multilayer optical film can be designed to have any variation of reflection-transmission magnitude for polarized light along either of its two orthogonal in-plane axes.

Alternatively, or in addition the fraction of reflection to transmission may be varied by including a diffuse coating on one or both sides of the multilayer optical film.

Exemplary materials that can be used in the fabrication of polymeric multilayer optical films can be found in PCT Publication WO 99/36248 (Neavin et al.). Exemplary two-polymer combinations that provide both adequate refractive index differences and adequate inter-layer adhesion include: (1) for polarizing multilayer optical film made using a process with predominantly uniaxial stretching, PEN/coPEN, PET/coPET, PEN/sPS, PET/sPS, PEN/Eastar, and PET/Eastar, where "PEN" refers to polyethylene naphthalate, "coPEN" refers to a copolymer or blend based upon naphthalenedicarboxylic acid, "PET" refers to polyethylene terephthalate, "coPET" refers to a copolymer or blend based upon terephthalic acid, "sPS" refers to syndiotactic polystyrene and its derivatives, and Eastar is a polyester or copolyester (believed to comprise cyclohexanedimethylene diol units and terephthalate units) commercially available from Eastman Chemical Co., Kingsport, Tenn.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel, PET/Ecdel, PEN/sPS, PET/sPS, PEN/coPET, PEN/PETG, and PEN/THV, where "PMMA" refers to polymethyl methacrylate, Ecdel is a thermoplastic polyester or copolyester (believed to comprise cyclohexanedicarboxylate units, polytetramethylene ether glycol units, and cyclohexanedimethanol units) commercially available from Eastman Chemical Co., and THV is a fluoropolymer commercially available from 3M Company, St. Paul, Minn.

Further details of suitable multilayer optical films and related designs and constructions can be found, for example, in U.S. Pat. No. 5,882,774 (Jonza et al.), U.S. Pat. No. 6,297,906 B1 (Allen et al.); U.S. Pat. No. 6,531,230 (Weber et al.); U.S. Pat. No. 6,888,675 B2 (Ouderkirk et al.); and in U.S. Pat. Appln. Publ. Nos. 2002/0031676 A1 (Jonza et al.) and US 2008/0037127 A1 (Weber).

The reflective-transmissive surface may have specular or diffuse reflective properties, or it may have reflective properties somewhere in between. While the reflective-transmissive surface is disposed opposite the opening, the reflective-transmissive surface or another reflective surface may be present on the remaining surface of surfaces of the cavity other than the optically smooth faces and the light source. For example the cover, may be partially reflective. Typically, it is desirable to maximize the area and amount of reflectivity of such surfaces in order to increase the amount of reflected light that is injected into the light guide(s). In one embodiment, the reflective-transmissive surface is present on substantially all of surfaces of the cavity other than the optically smooth faces and the cover.

Any or all of the covers may be, for example, transparent, translucent, reflective, opaque, or a combination thereof. Typically, the covers, and hence the openings of the corresponding cavities are oriented such that they are away from the view of an observer during the intended use. For example, any or all of the cover(s) may be situated on the same side of the lighting system, although for many applications this may be undesirable unnecessary or even aesthetically unattractive. The cover may be made of any suitable material that such as for example, metal, plastic, fiberboard, elastomer, or circuit board.

Optional light extraction structures are useful for extracting light from the light guide at desired points along its length, typically with a desired intensity level. Many types of light extraction structures are known including, for example, notches and protrusions. Examples of light extraction structures and details for their fabrication may be found, for example, in U.S. Pat. No. 5,432,876 (Appeldorn et al.) and U.S. Pat. No. 6,863,428 B2 (Lundin et al.); U.S. Pat. No. 6,033,604 (Lundin et al.); U.S. Pat. No. 6,039,553 (Lundin et al.); U.S. Pat. No. 6,077,462 (Lundin et al.); U.S. Pat. No. 6,259,855 (Lundin); U.S. Pat. No. 6,367,941 (Lea et al.); U.S. Pat. No. 6,379,592 (Lundin et al.); U.S. Pat. No. 6,623,667 (Lundin); U.S. Pat. No. 6,863,428 (Lundin); and U.S. Pat. No. 7,052,168 (Epstein et al.).

Optionally, a diffuse reflective layer may also be disposed on the core and/or optional cladding of light guides used in practice of the present disclosure. These may be particularly useful if desiring to achieve a neon or fluorescent lighting appearance. Exemplary diffuse reflective layers are described, for example, in U.S. Pat. No. 6,863,428 B2 (Lundin et al.).

Any suitable light source may be used; however if compact size is desired, light emitting diodes (that is, LEDs) and/or fiber optics are particularly useful. The light source may comprise multiple distinct light sources, which may be the same or different; for example, corresponding to individual colors (for example, red-blue-green). In the case of fiber optics a plurality of optical fibers may be coupled to a remotely located lamp of sufficient power, in such a way, noise and equipment associated with the lamp may be hidden from view of an observer viewing the lighting system.

Lighting systems according to the present disclosure may be used, for example, for: architectural applications (for example, recessed lighting, or in lieu of fluorescent or neon lighting); signage applications (for example, as neon-type signs); and for vehicular lighting (for example, trailer trim lighting, aisle lighting, marine lighting, automobile lighting, and aircraft lighting). For example, the lighting system may be used in automotive applications such as spoilers, along the edges of rear windows, or to follow the curve of a trunk lid, as side markers, emergency flashers, and center high mounted stop lamps.

Lighting systems according to the present disclosure can be made using light guides and a light injection coupler(s) according to the present disclosure. Referring now to FIG. 4, exemplary light injection coupler 400 comprises optically transmissive housing 480 having first, second, and third openings (421, 422, 423), and conduit 460 that extends therebetween. Each of the first and second openings 421, 422 has an optional respective collar 451, 452 (not shown), and is adapted to engage at least two end portions 432, 434 of light guides 405a, 405b while maintaining a cavity 420 therebetween. End portions 432, 434 are capable of guiding light corresponding to longitudinal directions 490a, 490b. Conduit 460 has reflective-transmissive surface 410, provided by optional multilayer optical film 412, adjacent cavity 420 and opposite third opening 423. As shown, optional multilayer optical film 412 is sized and shaped as to conform to dimensions of conduit 460 and openings 421, 422, 423 such that it fits flush against conduit 460. Typically, optional multilayer optical film 412 does not extend beyond any optional collars 451, 452 that are present.

End portions 432, 434 have respective optically smooth faces 425a, 425b aligned substantially perpendicularly to its respective longitudinal direction. Cover 430 comprises a light source 455 (shown here as an LED). Cover 430 is affixed to optically transmissive housing 480 by screws 485 and is proximate to and occludes third opening 423 of optically transmissive housing 480. LED light source 455, electrically connected to wires 465, is in optical communication with the reflective-transmissive surface 410 such that a major portion of any light emitted from light source 455 is reflected by the reflective-transmissive surface, including any subsequent re-reflection from other surfaces adjacent to the cavity, and injected into first and second end portions 432, 434, and such that a minor portion of any light emitted by light source 455 is transmitted through the reflective-transmissive surface 410 and through the optically transmissive housing 480.

The optically transmissive housing may be made of any suitably optically transmissive materials such as for example: glass; quartz; plastics such as, for example, polyesters, polyamides, polyolefins, styrenic polymers (for example, polystyrene, ABS plastic), and combinations thereof. In one exemplary embodiment, shown in FIG. 5, optically transmissive housing 580 comprises first and second portions 510, 512 flexibly connected by hinge 520. When assembled, first and second portions 510, 512 are fastened one to another by a mechanical fastener shown as snap clips 530. Other suitable mechanical fasteners include rivets, screws, clamps, clips, and combinations thereof.

The disclosures of all patents and publications cited hereinabove are incorporated herein by reference in their entirety.

Various modifications and alterations of this invention may be made by those skilled in the art without departing from the scope and spirit of this invention, and it should be understood that this invention is not to be unduly limited to the illustrative embodiments set forth herein.

What is claimed is:

1. A light injection coupler for coupling at least two end portions of at least one light guide, the light injection coupler comprising:
    an optically transmissive housing having first, second, and third openings, the optically transmissive housing comprising first and second portions flexibly connected by a hinge, and the first and second portions being further fastened one to another by at least one mechanical fastener;
    a conduit extending between the first, second, and third openings, each of the first and second openings being adapted to engage at least two end portions of the at least one light guide while maintaining a cavity therebetween, the at least two end portions being capable of guiding light in at least first and second respective longitudinal directions, the conduit having a reflective-transmissive surface adjacent to the cavity and opposite the third opening, and the at least two end portions each having an optically smooth face aligned substantially perpendicularly to the-longitudinal direction of the respective end portion; and
    a cover comprising a light source, the cover being affixed to the housing and disposed proximate to and occluding the third opening of the housing, the light source being in optical communication with the reflective-transmissive surface, wherein a major portion of any light emitted from the light source is reflected by the reflective-transmissive surface and injected into the at least first and second end portions, and wherein a minor portion of any light emitted by the light source being transmitted through the reflective-transmissive surface and through the optically transmissive housing.

2. The light injection coupler of claim 1, at least one of the first and second openings comprising a respective collar.

* * * * *